(12) United States Patent
Knyrim et al.

(10) Patent No.: US 11,969,867 B2
(45) Date of Patent: Apr. 30, 2024

(54) HAND-HELD POWER TOOL

(71) Applicant: Hilti Aktiengesellschaft, Schaan (LI)

(72) Inventors: Maximilian Knyrim, Ehingen (DE); Michael Unsöld, Penzing (DE)

(73) Assignee: Hilti Aktiengesellschaft, Schaan (LI)

( * ) Notice: Subject to any disclaimer, the term of this patent is extended or adjusted under 35 U.S.C. 154(b) by 17 days.

(21) Appl. No.: 17/632,601

(22) PCT Filed: Aug. 10, 2020

(86) PCT No.: PCT/EP2020/072343
§ 371 (c)(1),
(2) Date: Feb. 3, 2022

(87) PCT Pub. No.: WO2021/032515
PCT Pub. Date: Feb. 25, 2021

(65) Prior Publication Data
US 2022/0288758 A1    Sep. 15, 2022

(30) Foreign Application Priority Data
Aug. 19, 2019 (EP) .................... 19192219

(51) Int. Cl.
*B25D 17/04* (2006.01)
*B25D 11/12* (2006.01)
*B25D 16/00* (2006.01)

(52) U.S. Cl.
CPC ............. *B25D 16/00* (2013.01); *B25D 11/12* (2013.01); *B25D 2211/003* (2013.01); *B25D 2211/068* (2013.01); *B25D 2250/095* (2013.01)

(58) Field of Classification Search
CPC .. B25D 11/12; B25D 16/00; B25D 2211/003; B25D 2211/068; B25D 2250/095
See application file for complete search history.

(56) References Cited

U.S. PATENT DOCUMENTS 1,283,601 A * 11/1918 Truyter ................. B25D 11/10
                                                        173/110
2,475,504 A *  7/1949 Atwater .................. F16H 1/32
                                                        475/179
(Continued)

FOREIGN PATENT DOCUMENTS

DE            19738107 A1    3/1999
DE     10 2008054458 A1    6/2010
(Continued)

OTHER PUBLICATIONS

International Search Report of PCT/EP2020/072343, dated Nov. 10, 2020.

*Primary Examiner* — Thanh K Truong
*Assistant Examiner* — David G Shutty
(74) *Attorney, Agent, or Firm* — Davidson, Davidson & Kappel, LLC

(57) ABSTRACT

Hand-held power tool having a tool fitting for holding a striking and rotating tool on a working axis, an electric motor, an impact mechanism, which has a striker moved periodically along the working axis, and having a rotary drive, which drives a spindle bearing the tool fitting in a rotating manner about the working axis, the rotary drive having a step-down eccentric gear mechanism, connected to the electric motor, and the spindle being coupled to the eccentric gear mechanism.

21 Claims, 4 Drawing Sheets

(56) References Cited

U.S. PATENT DOCUMENTS

| | | | | | |
|---|---|---|---|---|---|
| 3,521,497 | A | * | 7/1970 | Schmuck | F16H 37/16 173/109 |
| 4,346,767 | A | * | 8/1982 | Vaughan | B25D 17/00 173/109 |
| 4,349,074 | A | * | 9/1982 | Ince | B25D 16/006 173/48 |
| 5,505,668 | A | * | 4/1996 | Koriakov-Savoysky | F16H 1/32 74/462 |
| 7,383,895 | B2 | * | 6/2008 | Aoki | B25D 17/24 173/210 |
| 8,403,789 | B2 | * | 3/2013 | Janek | F16H 1/32 475/116 |
| 10,099,359 | B2 | * | 10/2018 | Roberts | B25F 5/001 |
| 10,184,547 | B2 | * | 1/2019 | Fecko | F16H 1/32 |
| 10,391,621 | B2 | * | 8/2019 | Wiedner | B25D 16/00 |
| 10,710,230 | B2 | * | 7/2020 | Holubarsch | B25F 5/02 |
| 10,821,590 | B2 | | 11/2020 | Hartmann et al. | |
| 11,607,800 | B2 | * | 3/2023 | Zhang | F16H 1/32 |
| 2006/0137889 | A1 | * | 6/2006 | Hanke | B25D 17/06 173/217 |
| 2010/0300717 | A1 | * | 12/2010 | Baumann | B25D 17/26 173/171 |
| 2018/0304453 | A1 | * | 10/2018 | Schaer | B25F 5/001 |
| 2018/0361552 | A1 | * | 12/2018 | Hartmann | B25D 11/125 |

FOREIGN PATENT DOCUMENTS

| | | | |
|---|---|---|---|
| DE | 10 2016220192 A1 | 4/2018 | |
| EP | 3147084 A1 * | 3/2017 | B25D 16/00 |
| EP | 3181301 A1 | 6/2017 | |

\* cited by examiner

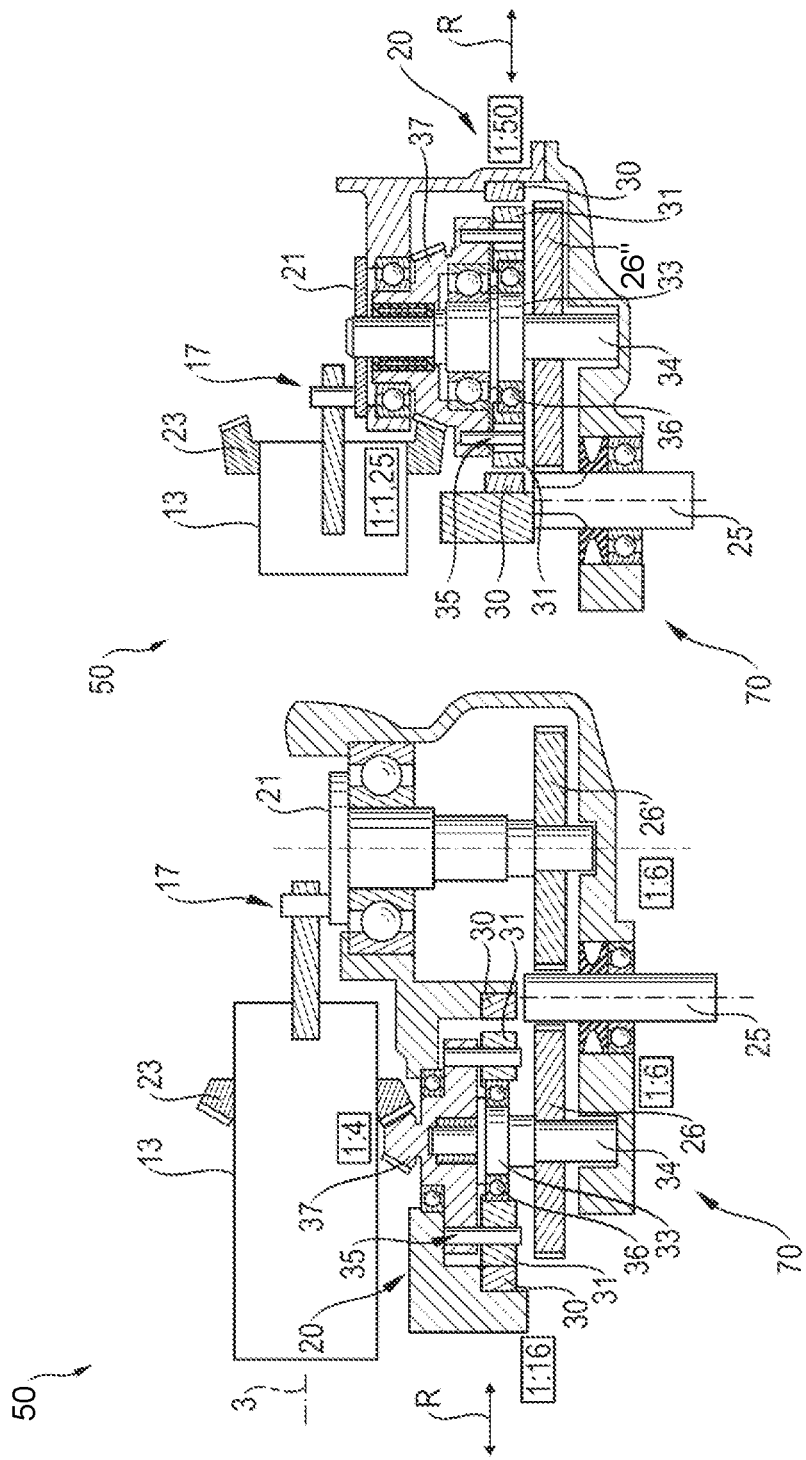

HAND-HELD POWER TOOL

The present invention relates to a hand-held power tool having a tool fitting for holding a striking and rotating tool on a working axis. The hand-held power tool is equipped with an electric motor, an impact mechanism, which has a striker moved periodically along the working axis, and with a rotary drive, which drives a spindle bearing the tool fitting in a rotating manner about the working axis.

BACKGROUND

Such a hand-held power tool, which can be in the form for example of a hammer drill, is known from EP 3 181 301 A1.

SUMMARY OF THE INVENTION

An object of the present invention is to provide a hand-held power tool, in particular a hammer drill or combination hammer, having a comparatively compact and robust rotary drive.

The present invention provides that the rotary drive has a step-down eccentric gear mechanism, connected to the electric motor, the spindle being coupled to the eccentric gear mechanism.

The invention incorporates the finding that when the drilling tool (striking and rotating tool) is varied, different drill bit diameters or drill bit types sometimes require a slower rotational speed of the tool fitting for the best possible drilling performance. This makes a step-down gear mechanism with a comparatively stronger reducing action necessary, this—at least in the hand-held power tools of the prior art—disadvantageously increasing the space requirement, the costs, the number of components, the complexity and the weight of these tools.

In the case of the hand-held power tool according to the invention, which can be in the form of a hammer drill or a combination hammer, an eccentric gear mechanism (also cycloidal gear or circular thrust gear) is used. This is instead of spur gears and/or bevel gears, which are exclusively or at least predominantly used in hand-held power tools of the prior art.

As a result, a comparatively compact and robust rotary drive can be provided.

It has been found to be advantageous if the eccentric gear mechanism has an internally toothed ring gear and an externally toothed internal gear. The ring gear can be arranged fixed to the frame with respect to the electric motor. In a particularly preferred embodiment, the internal gear is driven via a rotatably mounted eccentric. It has been found to be advantageous if the eccentric gear mechanism has a reduction of at least 1:40, preferably 1:50.

In a particularly preferred embodiment, the eccentric gear mechanism has a torsionally rigid coupling which is designed to compensate for a radial offset of the internal gear caused by the eccentric. The coupling is preferably formed as a parallel crank coupling or as a cross slide coupling.

It has been found to be advantageous if the impact mechanism has a transmission component for converting the rotary movement of the electric motor into a periodic translational movement parallel to the working axis. The transmission component is preferably integrated with the eccentric gear mechanism.

The transmission component may have an impact-mechanism eccentric wheel or a swash plate, which is arranged coaxially to the eccentric gear mechanism and/or is formed in one piece with a drive eccentric of the circular thrust gear.

The impact-mechanism eccentric wheel and the drive eccentric of the circular thrust gear may be one and the same component. Both the eccentric and an impact-mechanism eccentric wheel may be driven by one and the same eccentric shaft. The eccentric shaft and a crankshaft of the electric motor may be arranged coaxially to one another or offset parallel to one another.

In a further preferred embodiment, the rotary drive is synchronized with the impact mechanism. The impact mechanism may have an exciter connected to the transmission component and a pneumatic chamber, the striker preferably being coupled to the exciter via the pneumatic chamber.

Preferably, no couplings which could interrupt a transmission of a torque from the electric motor to the spindle are provided in the rotary drive.

Further advantages can be found in the following description of the figures. Various exemplary embodiments of the present invention are shown in the figures. The figures, the description and the claims contain numerous features in combination. A person skilled in the art will expediently also consider the features individually and combine them to form useful further combinations.

BRIEF DESCRIPTION OF THE DRAWINGS

In the figures, identical and similar components are denoted by the same reference signs. In the figures:

FIG. 2 shows a first preferred exemplary embodiment of a rotary drive;

FIG. 3 shows a second preferred exemplary embodiment of a rotary drive;

DETAILED DESCRIPTION

Figure 1:
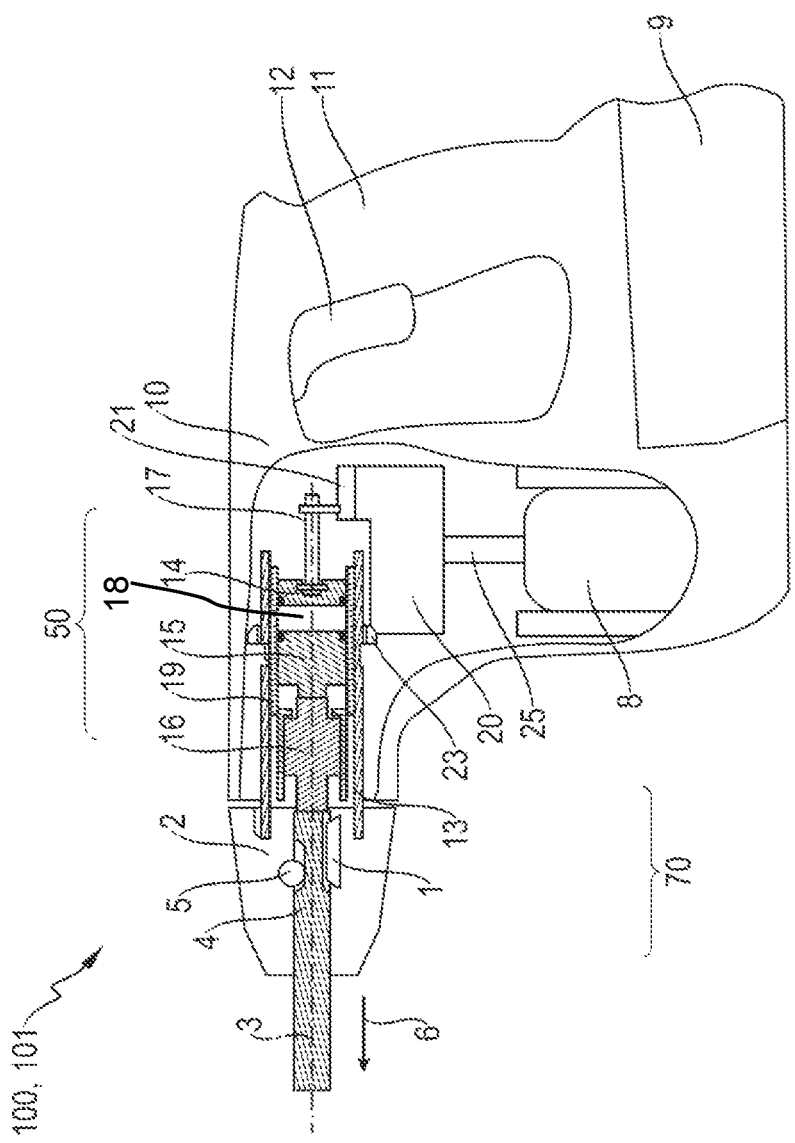
FIG. 1 shows a first preferred exemplary embodiment of a hand-held power tool according to the invention.

A preferred exemplary embodiment of a hand-held power tool 100 according to the invention is illustrated in FIG. 1. FIG. 1 shows a hammer drill 101 as an example of a percussive portable hand-held power tool 100. The hammer drill 101 has a tool fitting 2, into which a drill bit, chisel or other striking tool 4 can be inserted and locked in place coaxially with a working axis 3. The hammer drill 101 has a pneumatic impact mechanism 50, which can periodically exert blows in a striking direction 6 on the tool 4. A rotary drive 70 can rotate the tool fitting 2 continuously about the working axis 3. The pneumatic impact mechanism 50 and the rotary drive are driven by an electric motor 8, which is fed with electric current by a rechargeable battery 9 or a power cord.

The impact mechanism 50 and the rotary drive 70 are arranged in a machine housing 10. A handle 11 is typically arranged on a side of the machine housing 10 that faces away from the tool fitting 2. The user can hold and guide the hammer drill 101 by means of the handle 11 during operation. An additional auxiliary handle can be fastened close to the tool fitting 2. Arranged on or in the vicinity of the handle 11 is an operating button 12, which the user can actuate preferably with the holding hand. The electric motor 8 is switched on by the actuation of the operating button 12. Typically, the electric motor 8 rotates for as long as the operating button 12 is kept pressed.

The tool 4 is movable along the working axis 3 in the tool fitting 2. For example, the tool 4 has an elongate groove, in which a ball 5 or some other blocking body of the tool fitting 2 engages. The user holds the tool 4 in a working position in that the user presses the tool 4 indirectly against a substrate by way of the hammer drill 101.

The tool fitting 2 is fastened to a spindle 13 of the rotary drive 70. The tool fitting 2 can rotate about the working axis 3 with respect to the machine housing 10. At least one claw 1 or other suitable means in the tool fitting 2 transmits a torque from the tool fitting 2 to the tool 4.

According to the invention, the rotary drive 70 has a step-down eccentric gear mechanism 20 connected to the electric motor 8, the spindle 13 being coupled to the eccentric gear mechanism 20. The eccentric gear mechanism 20 is only schematically indicated in FIG. 1 and is explained in detail with reference to the other figures.

The pneumatic impact mechanism 50 has, in the striking direction 6, an exciter 14, a striker 15 and an anvil 16. The exciter 14 is forced to execute a periodic movement along the working axis 3 by means of the electric motor 8. The exciter 14 is attached via a transmission component 17 for converting the rotary movement of the electric motor 8 into a periodic movement in translation along the working axis 3. An example of a transmission component 17 contains an impact-mechanism eccentric wheel 21 or a wobble plate. A period of the movement in translation of the exciter 14 is defined by the rotational speed of the electric motor 8 and optionally by a reduction ratio in the transmission component 17.

The striker 15 couples to the movement of the exciter 14 via a pneumatic spring. The pneumatic spring is formed by a pneumatic chamber 18 closed off between the exciter 14 and the striker 15. The striker 15 moves in the striking direction 6 until the striker 15 strikes the anvil 16. The anvil 16 bears against the tool 4 in the striking direction 6 and transmits the impact to the tool 4. The period of the movement of the striker 15 is identical to the period of the movement of the exciter 14. The striker 15 thus strikes with a striking rate that is identical to the inverse of the period. The optimal striking rate is defined by the mass of the striker 15 and the geometric dimensions of the pneumatic chamber 18. An optimal striking rate may lie in the range between 25 Hz and 100 Hz.

The example of an impact mechanism 50 has a piston-like exciter 14 and a piston-like striker 15, which are guided along the working axis 3 by a guide tube 19. The exciter 14 and the striker 15 bear with their lateral surfaces against the inner surface of the guide tube 19. The pneumatic chamber 18 is closed off along the working axis 3 by the exciter 14 and the striker 15 and in a radial direction by the guide tube 19. Sealing rings in the lateral surfaces of the exciter 14 and striker 15 can improve the airtight closing off of the pneumatic chamber 18.

The rotary drive 70 contains the spindle 13, which is arranged coaxially with the working axis 3. The spindle 13 is for example hollow, and the impact mechanism 50 is arranged within the spindle. The tool fitting 2 is fitted on the spindle 13. The tool fitting 2 can be connected releasably or permanently to the spindle 13 via a closing mechanism. The spindle 13 is connected via the step-down eccentric gear mechanism 20 to the electric motor 8, more precisely via its crankshaft 25. The speed of the spindle 13 is lower than the speed of the electric motor 8.

The spindle 13 rotates preferably periodically. For example, the spindle 13 may be rotated continuously via the step-down eccentric gear mechanism 20 at a speed of less than 50 revolutions per minute (rpm). The spindle 13 is preferably rotated continuously via the step-down eccentric gear mechanism 20 via a bevel gearing 23 provided on the spindle 13. The rotary drive 70 is synchronized with the impact mechanism 50.

The spindle 13 may be rigidly coupled to the electric motor 8. A rotary movement of the electric motor 8 enforces a rotary movement of the spindle 13. Preferably, no couplings which could interrupt a transmission of a torque from the electric motor 8 to the spindle 13 are provided in the rotary drive 70.

FIG. 2 then shows a first preferred exemplary embodiment of a rotary drive 70, which in FIG. 1 is only schematically indicated within the hand-held power tool 100.

The rotary drive 70 has a step-down eccentric gear mechanism 20 connected to the electric motor 8 via the crankshaft 25. For this, the crankshaft 25 is coupled to an eccentric shaft 34 via a shaft gearwheel 26. A transmission ratio of 1:6 between the crankshaft 25 and the eccentric shaft 34 is achieved here by way of example via the shaft gearwheel 26. On the output side, the eccentric gear mechanism 20 is coupled to the spindle 13 via a bevel gearing 23.

The eccentric gear mechanism 20 has an internally toothed ring gear 30 and an externally toothed internal gear 31. The ring gear 30 is arranged fixed to the frame with respect to the electric motor 8. The internal gear 31 may be driven via a rotatably mounted eccentric 33. The eccentric 33 is connected to the crankshaft 25 for conjoint rotation. The eccentric 33 and the crankshaft 25 may be formed integrally with one another.

The eccentric gear mechanism 20 has a torsionally rigid coupling 35, which is designed to compensate for a radial offset (radial direction R) of the internal gear 31 caused by the eccentric 33. In the exemplary embodiments of FIGS. 2 to 5, the coupling 35 is in each case formed as a parallel crank coupling. The torsionally rigid coupling 35 is coupled on the one hand to the internal gear 31 and on the other hand to an output body 37. The output body 37 is in turn coupled via the bevel gearing 23 (cf. also FIG. 1) to the spindle 13. A transmission ratio of 1:4 between the output body 37 and the spindle 13 is realized here by way of example via the bevel gearing 23.

In the exemplary embodiment of FIG. 2, the eccentric gear mechanism 20 itself has a transmission ratio of 1:16 between the internal gear 31 and the ring gear 30.

As can already be seen from FIG. 1, the impact mechanism 50, only partially shown here in FIG. 2, has a transmission component 17 for converting the rotary movement of the electric motor 8 into a periodic translational movement parallel to the working axis 3. For this, the transmission component 17 contains an impact-mechanism eccentric wheel 21. The impact-mechanism eccentric wheel 21 is rotationally coupled to the crankshaft 25 via a further shaft gearwheel 26'. By way of example, a transmission ratio of 1:6 between the crankshaft 25 and the impact-mechanism eccentric wheel 21 is realized here.

A second preferred exemplary embodiment of a rotary drive 70 is shown in FIG. 3. In this exemplary embodiment, the transmission component 17 together with the impact-mechanism eccentric wheel 21 is integrated or at least partially integrated with the eccentric gear mechanism 20. For this, the impact-mechanism eccentric wheel 21 is arranged coaxially to the eccentric shaft 34. Both the eccentric 33 and the impact-mechanism eccentric wheel 21 are driven by one and the same eccentric shaft 34.

It can be clearly seen that the eccentric shaft 34, which drives the eccentric 33, and the crankshaft 25 of the electric motor (see, e.g., electric motor 8 in FIG. 1) are arranged offset parallel to one another. Here, by way of example, a transmission ratio of 1:6 between the crankshaft 25 and the eccentric shaft 34 is realized via a shaft gearwheel 26".

A transmission ratio of 1:1.25 between the output body 37 and the spindle 13 is realized here by way of example via the bevel gearing 23. In the exemplary embodiment of FIG. 3, the eccentric gear mechanism 20 itself has a transmission ratio of 1:50 between the internal gear 31 and the ring gear 30. The eccentric 33 here drives the internal gear 31, which rolls in the ring gear 30 fixed to the frame. The different number of teeth between the ring gear 30 and the inner gear 31 creates a rotary movement. For the greatest possible transmission ratio, by way of example a difference in the number of teeth of 1 is sought here. Here, the internal gear 31 rotates relative to the ring gear 30 fixed to the frame by one tooth per eccentric rotation. The internal gear 31 thus performs two superposed movements: The eccentric tumbling movement (in the radial direction R) and a comparatively slow rotary movement.

Figure 4:
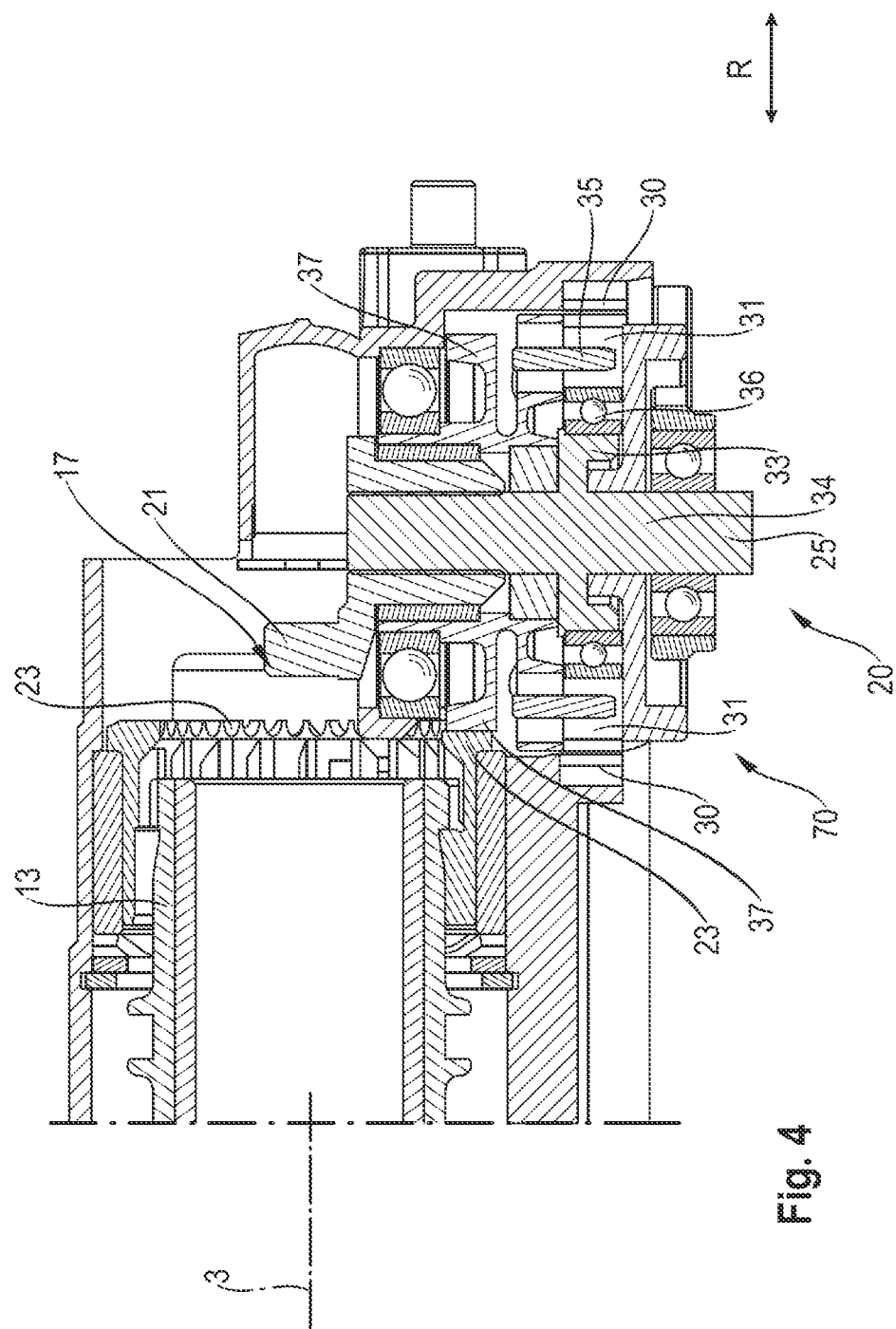
FIG. 4 shows a third preferred exemplary embodiment of a rotary drive.

A third preferred exemplary embodiment of a rotary drive 70 is shown in FIG. 4. In this exemplary embodiment, the transmission component 17 together with the impact-mechanism eccentric wheel 21 is further spatially integrated with the eccentric gear mechanism 20—in comparison with the exemplary embodiment of FIG. 3. This was achieved by the eccentric shaft 34 being formed or arranged identically, or at least coaxially, to the crankshaft 25. As in the exemplary embodiment of FIG. 3, the impact-mechanism eccentric wheel 21 is also arranged here coaxially to the eccentric shaft 34. Both the eccentric 33 and the impact-mechanism eccentric wheel 21 are driven by one and the same eccentric shaft 34. As a difference from the exemplary embodiments of FIG. 2 and FIG. 3, the one bevel gearing 23, via which a movement from the output body 37 to the spindle 13 takes place, is arranged on the end face of the spindle 13. Also in the exemplary embodiment of FIG. 4, transmission to an exciter, see, e.g. exciter 14 in FIG. 1, is carried out via the transmission component 16, which contains the impact-mechanism eccentric wheel 21.

Figure 5:
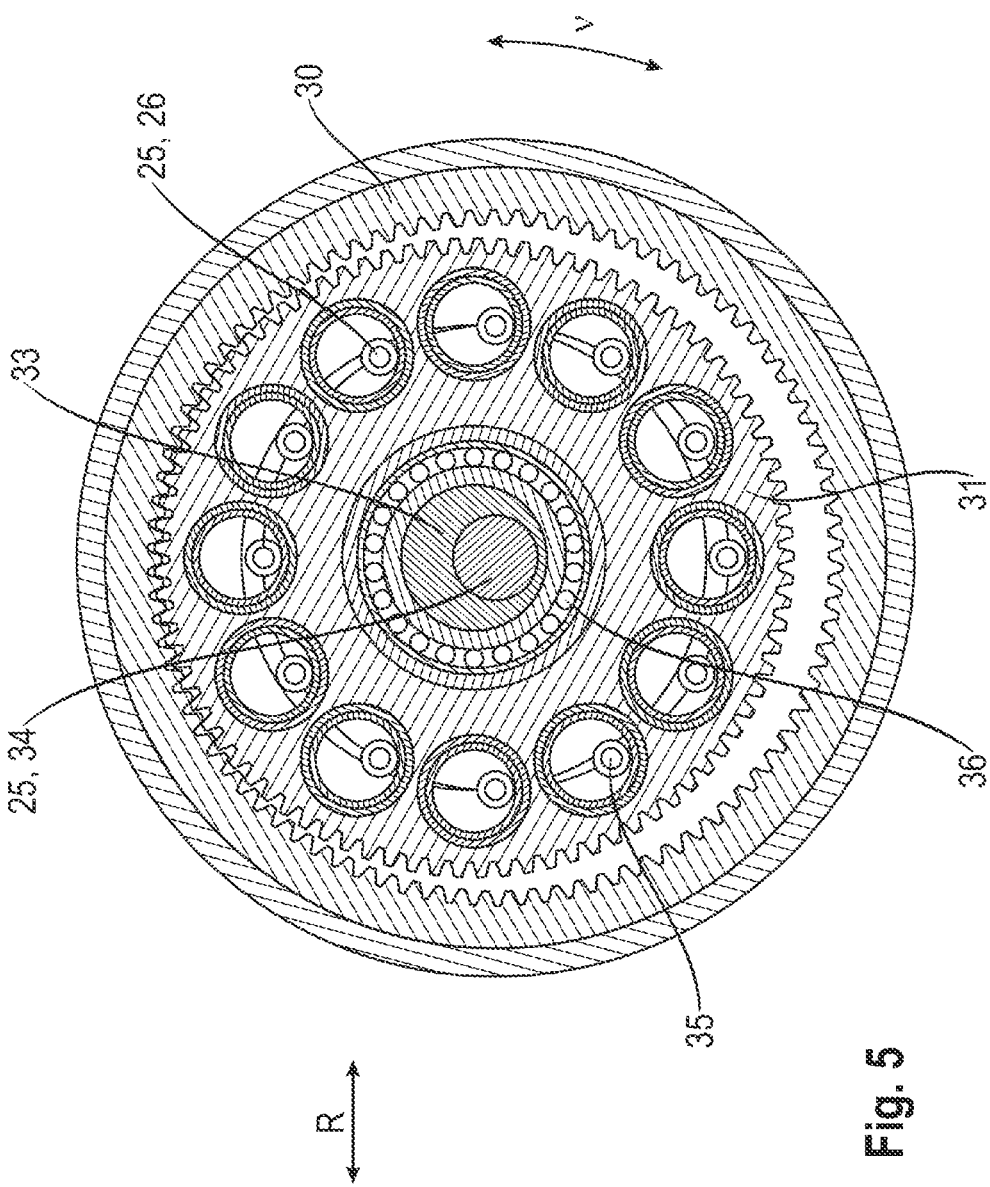
FIG. 5 shows a plan view of an eccentric gear mechanism of FIGS. 2 to 5.

Finally, FIG. 5 shows a plan view of the eccentric gear mechanism 20, which is used in the exemplary embodiments of FIGS. 2 to 5. The eccentric 33, which is arranged in the center and is supported by a ball bearing 36 within the internal gear 31, can be clearly seen. The eccentric is driven via the eccentric shaft 34 (in one piece with the crankshaft 25 in FIG. 4), whereby the internal gear 31 performs two superposed movements, specifically an eccentric wobbling movement (in the radial direction R) and a comparatively slow rotary movement (in the circumferential direction U). The ring gear 30 is arranged fixed to the frame in relation to the machine housing 10 (see FIG. 1) of the hand-held power tool. The eccentric shaft 34 is arranged coaxially to the ring gear 30 (apart from the eccentric 33). The torsionally rigid coupling 35, which in the present case is formed as a parallel crank coupling, can also be clearly seen.

LIST OF REFERENCE SIGNS

1 Claw
2 Tool fitting
3 Working axis
4 Striking tool
5 Ball
6 Striking direction
8 Electric motor
9 Rechargeable battery
10 Machine housing
11 Handle
12 Operating button
13 Spindle
14 Exciter
15 Striker
16 Anvil
17 Transmission component
18 Pneumatic chamber
19 Guide tube
20 Eccentric gear mechanism
21 Impact-mechanism eccentric wheel
23 Bevel gearing
25 Crankshaft
26, 26', 26" Shaft gearwheel
30 Ring gear
31 Internal gear
33 Eccentric
34 Eccentric shaft
35 Torsionally rigid coupling
36 Ball bearing
37 Output body
50 Impact mechanism
70 Rotary drive
100 Hand-held power tool
101 Hammer drill
R Radial direction
U Circumferential direction

What is claimed is:

1. A hand-held power tool comprising:
   a tool fitting for holding a striking and rotating tool on a working axis;
   an electric motor;
   an impact mechanism having a striker moved periodically along the working axis; and
   a rotary drive driving a spindle bearing the tool fitting in a rotating manner about the working axis, the rotary drive having a step-down eccentric gear mechanism connected to the electric motor, the spindle being coupled to the eccentric gear mechanism; wherein the eccentric gear mechanism has an internally toothed ring gear and an externally toothed internal gear, the ring gear being arranged fixed with respect to a machine housing of the electric motor, and the internal gear being driven via a rotatably mounted eccentric.

2. The hand-held power tool as recited in claim 1 wherein the eccentric gear mechanism has a torsionally rigid coupling designed to compensate for a radial offset of the internal gear caused by the eccentric.

3. The hand-held power tool as recited in claim 2 wherein the coupling is formed as a parallel crank coupling or as a cross slide coupling.

4. The hand-held power tool as recited in claim 1 wherein the impact mechanism has a transmission for converting a rotary movement of the electric motor into a periodic translational movement parallel to the working axis.

5. The hand-held power tool as recited in claim 4 wherein the transmission is integrated with the eccentric gear mechanism.

6. The hand-held power tool as recited in claim 4 wherein the transmission has an impact-mechanism eccentric wheel or a swash plate arranged coaxially to the eccentric gear mechanism or formed in one piece with an eccentric of the eccentric gear mechanism.

7. The hand-held power tool as recited in claim 4 wherein the impact mechanism has an exciter connected to the transmission, and a pneumatic chamber, the striker being coupled to the exciter via the pneumatic chamber.

8. The hand-held power tool as recited in claim 4 wherein the transmission includes an impact-mechanism eccentric wheel rotationally coupled to a crankshaft of the electric motor via a further shaft gearwheel.

9. The hand-held power tool as recited in claim 1 wherein the rotary drive is synchronized with the impact mechanism.

10. The hand-held power tool as recited in claim 1 wherein eccentric gear mechanism has a reduction of at least 1:40.

11. The hand-held power tool as recited in claim 1 wherein eccentric gear mechanism has a reduction of at least 1:50.

12. The hand-held power tool as recited in claim 1 wherein the eccentric gear mechanism has an eccentric shaft bearing an eccentric, the eccentric shaft formed or arranged coaxially to a crankshaft of the electric motor.

13. A hammer drill comprising the hand-held power tool as recited in claim 1.

14. The hand-held power tool as recited in claim 1 wherein the rotary drive having the step-down eccentric gear mechanism is connected to the electric motor via a crankshaft.

15. The hand-held power tool as recited in claim 14 wherein the crankshaft is coupled to an eccentric shaft via a shaft gearwheel.

16. The hand-held power tool as recited in claim 15 wherein the rotatably mounted eccentric is connected to the crankshaft for conjoint rotation.

17. The hand-held power tool as recited in claim 16 wherein the rotatably mounted eccentric and the crankshaft are formed integrally with one another.

18. The hand-held power tool as recited in claim 1 wherein a transmission ratio of 1:6 between the crankshaft and the eccentric shaft is achieved via the shaft gearwheel.

19. The hand-held power tool as recited in claim 1 wherein the eccentric gear mechanism has a torsionally rigid coupling designed to compensate for a radial offset of the internal gear caused by the rotatably mounted eccentric, the torsionally rigid coupling being coupled to the internal gear and to an output body coupled to the spindle.

20. The hand-held power tool as recited in claim 19 wherein the output body is coupled via a bevel gearing to the spindle.

21. The hand-held power tool as recited in claim 20 wherein a transmission ratio of 1:4 between the output body and the spindle is realized via the bevel gearing.

* * * * *